US012774930B2

(12) United States Patent
Jung et al.

(10) Patent No.: US 12,774,930 B2
(45) Date of Patent: Oct. 27, 2026

(54) THREE-DIMENSIONALLY STACKED MULTI-MODAL SENSOR FOR SIMULTANEOUSLY DETECTING PRESSURE AND TEMPERATURE AND METHOD OF MANUFACTURING SAME

(71) Applicant: POSTECH RESEARCH AND BUSINESS DEVELOPMENT FOUNDATION, Pohang-si (KR)

(72) Inventors: Sungjune Jung, Pohang-si (KR); Youngmin Jo, Pohang-si (KR); Sanghoon Baek, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 323 days.

(21) Appl. No.: 18/617,813

(22) Filed: Mar. 27, 2024

(65) Prior Publication Data

US 2024/0337544 A1 Oct. 10, 2024

(30) Foreign Application Priority Data

Apr. 7, 2023 (KR) ........................ 10-2023-0046264

(51) Int. Cl.

| | |
|---|---|
| ***G01L 1/18*** | (2006.01) |
| ***G01D 21/02*** | (2006.01) |
| ***G01K 7/01*** | (2006.01) |
| ***G01L 1/20*** | (2006.01) |
| ***G01L 1/22*** | (2006.01) |

(Continued)

(52) U.S. Cl.

CPC ................ *G01L 1/18* (2013.01); *G01D 21/02* (2013.01); *G01K 7/01* (2013.01); *G01L 1/20* (2013.01); *G01L 1/2281* (2013.01); *G01L 1/2293* (2013.01); *G01L 1/26* (2013.01); *G06F 3/0414* (2013.01)

(58) Field of Classification Search

CPC . G01L 1/18; G01L 1/20; G01L 1/2281; G01L 1/2293; G01L 1/26; G01D 21/02; G01K 7/01; G06F 3/0414

See application file for complete search history.

(56) References Cited

U.S. PATENT DOCUMENTS

| | | | | |
|---|---|---|---|---|
| 9,466,781 | B2 * | 10/2016 | Elmegreen ............. | H10N 30/40 |
| 10,403,759 | B2 * | 9/2019 | Jung ...................... | H10D 86/60 |

(Continued)

OTHER PUBLICATIONS

Youngmin Jo et al., "3D-stacked thin-film transistors for signal decoupling of pressure and temperature", KFPE 2022, May 26, 2022, Busan Westin Josun Hotel, Korea.

(Continued)

*Primary Examiner* — Ryan D Walsh

(74) *Attorney, Agent, or Firm* — LEX IP MEISTER, PLLC

(57) ABSTRACT

Proposed is a three-dimensionally stacked multi-mode sensor for simultaneously detecting pressure and temperature. The multi-mode sensor includes a temperature sensor part including a first thin film transistor; and a pressure sensor part including a second thin film transistor and a piezoresistive layer stacked in a perpendicular direction on the temperature sensor part, the piezoresistive layer including a piezoresistive sheet. The multi-mode sensor can accurately detect pressure and temperature simultaneously without being affected by temperature changes.

20 Claims, 13 Drawing Sheets

(51) Int. Cl.
*G01L 1/26* (2006.01)
*G06F 3/041* (2006.01)

(56) References Cited

U.S. PATENT DOCUMENTS

| | | | | |
|---|---|---|---|---|
| 10,624,582 | B2 * | 4/2020 | Liu | A61B 5/6813 |
| 2020/0013946 | A1 * | 1/2020 | Cakmak | H10N 30/857 |
| 2023/0271320 | A1 * | 8/2023 | Dayeh | B25J 19/028 700/260 |

OTHER PUBLICATIONS

Youngmin Jo et al., "3D-stacked Thin-film Transistors for Signal Decoupling of Pressure and Temperature", IMID 2022, Aug. 23, 2022, Bexco, Busan, Korea.
Youngmin Jo et al., "Multi-functional Active-matrix Sensor Capable of Distinguishing between Thermal and Pressure Stimuli", ICFPE 2022, Oct. 11, 2022, Shinhwa World, Jeju Island, Korea.
Youngmin Jo et al., "3D-Stacked Thin-Film Transistors for Simultaneous Detection of Pressure and Temperature", 2022 MRS Fall Meeting & Exhibit, Nov. 27, Boston, Massachusetts.

* cited by examiner

Example 2-1

Example 2-1

Example 2-1

THREE-DIMENSIONALLY STACKED MULTI-MODAL SENSOR FOR SIMULTANEOUSLY DETECTING PRESSURE AND TEMPERATURE AND METHOD OF MANUFACTURING SAME

CROSS REFERENCE TO RELATED APPLICATION

The present application claims priority to Korean Patent Application No. 10-2023-0046264, filed 7 Apr. 2016, the entire contents of which is incorporated herein for all purposes by this reference.

BACKGROUND OF THE DISCLOSURE

1. Field of the Disclosure

The present disclosure relates to a three-dimensionally stacked multi-mode sensor for simultaneously detecting pressure and temperature and a method of manufacturing the same.

2. Description of the Related Art

Tactile sensors are sensors that typically detect touch, pressure, temperature, and vibration. Tactile sensors are used in tactile-based user interfaces mounted on mobile devices and laptops, and in the field of humanoid robots, and can be mounted on various electronic devices that contact and communicate with people. In particular, flexible pressure sensors among tactile sensors can be worn and attached to curved areas such as people or robot arms, so flexible pressure sensors can be applied to wearable sensors or robot prosthetic hands. Research on pressure sensors that convert pressure information into electrical signals is actively underway, and pressure sensors are being produced in various ways.

Pressure sensor manufacturing methods largely include a passive matrix method and an active matrix method. In the case of a passive matrix, independent control of each pixel is difficult, crosstalk may occur, and the operation speed is slow. The active matrix has a combined form of thin-film transistors (TFTs) and elements. Herein, the TFTs include individual elements of the sensor arrays acting as switches, and the elements convert changes of the target stimulus into changes thereof with electrical characteristics such as resistance or capacitance. Since the degree of changes of the target stimulus is detected through the changes in the current value flowing through the TFT, the active matrix can more accurately detect the degree of changes of the stimulus than the passive matrix.

However, since current flowing through the TFT, which is an essential element of an active matrix-based sensor, is affected by temperature, the current value changes due to changes in temperature even if the target stimulus such as pressure or humidity does not change. As a result, the active matrix-based sensors have the problem of not being able to accurately detect the amount of change in stimulation.

Therefore, there is a need to develop technology to solve the problems of the active matrix-based sensor described above.

SUMMARY OF THE DISCLOSURE

The present disclosure is to provide a three-dimensionally stacked multi-mode sensor in which the degree of changes of target stimulus detected by the sensor does not change due to other factors.

The present disclosure is also to provide a three-dimensionally stacked multi-mode sensor that can accurately measure pressure by adjusting the temperature value measured by the temperature sensor when used.

The present disclosure is also to provide a three-dimensionally stacked multi-mode sensor that can accurately detect each of a plurality of changes of target stimulus simultaneously.

The present disclosure is also to provide a three-dimensionally stacked multi-mode sensor with improved integration by stacking sensors in the same area.

According to one aspect of the present disclosure, there is provided a three-dimensionally stacked multi-mode sensor 10 for simultaneously detecting pressure and temperature. The multi-mode sensor 10 includes a temperature sensor part 100 including a first thin film transistor 110; and a pressure sensor part 200 including a second thin film transistor 210 and a piezoresistive layer 220 stacked in a perpendicular direction on the temperature sensor part 100, the piezoresistive layer 220 including a piezoresistive sheet 221.

In addition, the multi-mode sensor 10 may measure the pressure value by adjusting a current value measured by the pressure sensor part 200 corresponding to a temperature measured by the temperature sensor part 100.

In addition, the first thin film transistor 110 may comprise: a first source electrode 111 and a first drain electrode 112; a first semiconductor channel layer 113 formed between the first source electrode 111 and the first drain electrode 112; a first dielectric layer 114 formed on the first source electrode 111, the first drain electrode 112, and the first semiconductor channel layer 113; and a first gate electrode 115 formed on the first dielectric layer 114.

In addition, the second thin film transistor 210 may comprise: the first gate electrode 115; a second dielectric layer 214 formed on the first gate electrode 115; a second source electrode 211 and a second drain electrode 212 formed on the second dielectric layer 214; and a second semiconductor channel layer 213 formed between the second source electrode 211 and the second drain electrode 212, wherein the second thin film transistor 210 and the first thin film transistor 110 may share the first gate electrode 115.

In addition, the piezoresistive layer 220 may further comprises a pad 222 electrically connected to the piezoresistive sheet 221, and the pressure sensor part 200 may further comprise a via 240 electrically connecting the pad 222 and the second source electrode 211 to each other.

In addition, an upper portion of the piezoresistive sheet 221 is provided with a plurality of protrusions 223 protruding outward, and each of the protrusions 223 may have a shape in which the cross-sectional area thereof gradually increases as a distance to the second semiconductor channel layer 213 decreases.

In addition, when an external pressure source applies an increasing force in a direction perpendicular to the piezoresistive sheet 221, the protrusions 223 are deformed, and a resistance value of the piezoresistive sheet 221 may decrease.

In addition, the protrusions 223 may have a dome, cone, elliptical cone, polygonal pyramid, truncated cone, elliptical truncated cone, or polygonal truncated cone shape.

In addition, the piezoresistive sheet 221 may comprise an elastic body and a conductive material.

In addition, the conductive material may comprise one or more types selected from the group consisting of reduced graphene oxides (rGOs), carbon nanotubes (CNTs), graphene, carbon black, graphite, poly(3,4-ethylenedioxythiophene) (PEDOT), Al, Au, Cu, Ag, Ti, and Pt.

In addition, the elastic body may comprise one or more types selected from the group consisting of polyvinylidene fluoride (PVDF), polydimethyl siloxane (PDMS), ecoflex, silicone rubber, fluoro silicone rubber, vinyl methyl silicone rubber, styrene-butadiene rubber, styrene-ethylene-butylene-styrene rubber, acryl rubber, butadiene rubber, chloro isobutylene isoprene rubber, polychloroprene rubber, epichlorohydrin rubber, ethylene propylene rubber, ethylene propylene diene rubber, polyether urethane rubber, polyisoprene rubber, isobutylene isoprene butyl rubber, acrylonitrile butadiene rubber, and polyurethane rubber.

In addition, the first gate electrode 115, the first source electrode 111, the second source electrode 211, the first drain electrode 112, or the second drain electrode 212 may comprise one or more types selected from the group consisting of Au, Al, Ag, Be, Bi, Co, Cu, Cr, Hf, In, Mn, Mo, Mg, Ni, Nb, Pb, Pd, Pt, Rh, Re, Ru, Sb, Ta, Te, Ti, V, W, Zr, Zn, PEDOT:PSS, graphene, carbon nanotubes (CNTs), and silver nanowires.

In addition, the pressure sensor part 200 may further comprise a protective layer 230 provided between the second semiconductor channel layer 213 and the piezoresistive sheet 221.

In addition, the protective layer 230 may comprise one or more types selected from the group consisting of parylene, polydimethylsiloxane (PDMS), Cytop, polystyrene (PS), polymethylmethacrylate (PMMA), polyvinyl pyrrolidone (PVP), polyimide (PI), $SiO_2$, $Al_2O_3$, $HfO_2$, $ZrO_2$, $Y_2O_3$, and $Ta_2O_5$.

In addition, the three-dimensionally stacked multi-mode sensor 10 may further comprise a substrate 300, and the substrate 300 is positioned on a first source electrode 111, a first drain electrode 112, and a first semiconductor channel layer 113 and may be disposed on a side opposite to a first gate electrode 115.

In addition, the substrate 300 may comprise one or more types selected from the group consisting of polymer, silicon, glass, and a metal.

In addition, the polymer may comprise one or more types selected from the group consisting of parylene, poly(ethylene 2,6-naphthalate) (PEN), poly(ethylene terephthalate) (PET), polyimide(PI), polyethersulphone, polyacrylate, polyetherimide, polyphenylene sulfide, polyallylate, polycarbonate, cellulose triacetate, and cellulose acetate propionate.

In addition, a semiconductor channel layer may comprise one or more types selected from the group consisting of a n-type organic semiconductor, a p-type organic semiconductor, and an oxide semiconductor.

In addition, the n-type organic semiconductor may comprise one or more types selected from the group consisting of DPP-DTT(poly[2,5-(2-octyldodecyl)-3,6-diketopyrrolopyrrole-alt-5,5-(2,5-di(thien-2-yl)thieno[3,2-b]thiophene)]), N2200(poly{[N,N'-bis(2-octyldodecyl)-naphthalene-1,4,5,8-bis(dicarboximide)-2,6-diyl]-alt-5,5'-(2,2'-bithiophene)}, anthracene, tetracene, hexacene, quinoline, naphthylridine, quinazoline, anthradithiophene, fluorene, perylenedicarboximide, naphthalene diimide, oligo-thiophene, 6,13-bis(triisopropylsilylethynyl)pentacene, 5,11-bis(triethylsilylethynyl)anthradithiophene, 2,8-difluoro-5,11-bis (triethylsilylethynyl)anthradithiophene, PCBM, Cu-phthalocyanine, and Zn-Phthalocyanine; and the p-type organic semiconductor comprises one or more types selected from the group consisting of diF-TES-ADT (2,8-difluoro-5,11-bis(triethylsilylethynyl)anthradithiophene), pentacene, poly(3-hexylthiophene), poly(3-pentylthiophene), poly3-(butylthiophene), benzo[1,2-b:4,5-b']dithiophene, PBDT2FBT-2EHO(poly(4,8-bis(2-ethylhexyloxy)benzo[1,2-b:4,5-b']dithiophene-alt-4,7-bis(4-(2-ethylhexyl)-2-thienyl)-5,6-difluoro-2,1,3-benzothiadiazole), and PDPP3T (poly(diketopyrrolopyrrole-terthiophene)).

According to another aspect of the present disclosure, there is provided a three-dimensionally stacked multi-mode sensor 10' comprising: a temperature sensor part 100' comprising a first' thin film transistor 110'; and a pressure sensor part 200' comprising a second' thin film transistor 210' and a piezoresistive layer 220' stacked in a perpendicular direction on the temperature sensor part 100' the piezoresistive layer 220' comprising a piezoresistive sheet 221', wherein the first' thin film transistor 110' comprises: a first' gate electrode 115'; a first' dielectric layer 114' formed on the first' gate electrode 115'; a first' source electrode 111' and a first' drain electrode 112' formed on the first' dielectric layer 114'; a first' semiconductor channel layer 113' formed between the first' source electrode 111' and the first' drain electrode 112'; a second' dielectric layer 116' formed on the first' semiconductor channel layer 113'; and a second' gate electrode 215' formed on the second' dielectric layer 116', and wherein the second' thin film transistor 210' comprises: a second' gate electrode 215'; a third' dielectric layer 214' formed on the second' gate electrode 215'; a second' source electrode 211' and a second' drain electrode 212' formed on the third' dielectric layer 214'; and a second' semiconductor channel layer 213' formed between the second' source electrode 211' and the second' drain electrode 212'.

In addition, the first' thin film transistor 110' may further comprise a via 117' electrically connecting the first' gate electrode 115' and the second' gate electrode 215' to each other.

A three-dimensionally stacked multi-mode sensor array for simultaneously detecting pressure and temperature, the multi-mode sensor array comprising multiple three-dimensionally stacked multi-mode sensors arranged in multiple rows and multiple columns, the multi-mode sensor array 20 comprising: a temperature sensor part 100 comprising a first thin film transistor 110; and a pressure sensor part 200 comprising a second thin film transistor 210 and a piezoresistive layer 220 and stacked in a perpendicular direction on the temperature sensor part 100, the piezoresistive layer 220 including a piezoresistive sheet 221; wherein the first thin film transistor 110 and the second thin film transistor 210 located in each row share a gate electrode 115, and the first thin film transistor 110 and the second thin film transistor 210 located in each column share a drain electrode 112, 212.

According to another aspect of the present disclosure, there is provided a method of manufacturing a three-dimensionally stacked multi-mode sensor 10 for simultaneously detecting pressure and temperature, the method comprising: (a) forming a temperature sensor part 100 comprising a first thin film transistor 110; and (b) forming a pressure sensor part 200 comprising a second thin film transistor 210 and a piezoresistive sheet 221 and stacked in a perpendicular direction on the temperature sensor part 100.

In addition, step (a) may comprise: (a-1) forming a first source electrode 111 and a first drain electrode 112; (a-2) forming a first semiconductor channel layer 113 between the first source electrode 111 and the first drain electrode 112; (a-3) forming a first dielectric layer 114 on the first source electrode 111, the first drain electrode 112, and the first semiconductor channel layer 113; and (a-4) forming a first gate electrode 115 on the first dielectric layer 114.

In addition, step (b) may comprise: (b-1) forming a second dielectric layer 214 on a first gate electrode 115; (b-2) forming a second source electrode 211 and a second drain electrode 212 on the second dielectric layer 214; and (b-3) forming a second semiconductor channel layer 213 between the second source electrode 211 and the second drain electrode 212, wherein the second thin film transistor 210 and the first thin film transistor 110 may share the first gate electrode 115.

In addition, step (a-1) may be carried out by inkjet printing.

In addition, step (a-3) may be carried out by chemical vapor deposition (CVD).

The three-dimensionally stacked multi-mode sensor 10 of the present disclosure can accurately sense pressure and temperature simultaneously without being affected by temperature changes.

In addition, the three-dimensionally stacked multi-mode sensor 10 of the present disclosure can improve sensor integration by stacking sensors in the same area.

BRIEF DESCRIPTION OF THE DRAWINGS

Since these drawings are for reference in explaining exemplary embodiments of the present disclosure, the technical idea of the present disclosure should not be interpreted as limited to the attached drawings.

DESCRIPTION OF THE PREFERRED EMBODIMENTS

Hereinafter, embodiments of the present disclosure will be described in detail with reference to the attached drawings so that those skilled in the art can easily implement the present disclosure.

However, the following description is not intended to limit the present disclosure to specific embodiments, and in describing the present disclosure, if it is determined that a detailed description of related known technology may obscure the gist of the present disclosure, the detailed description will be omitted.

Terms used herein are merely used to describe specific embodiments. This is not intended to limit the present disclosure. Singular expressions include plural expressions unless the context clearly dictates otherwise. In this application, terms such as “comprise” or “have” are intended to indicate the presence of features, numbers, steps, operations, components, or a combination thereof described in the specification. Accordingly, the term should be understood as not excluding in advance the presence or addition of one or more other features, numbers, steps, operations, components, or combinations thereof.

Additionally, terms including ordinal numbers, such as first, and second, which will be used below, may be used to describe various components, but the components are not limited by the terms. The terms are used only for the purpose of distinguishing one component from another. For example, a first component may be named a second component, and similarly, the second component may also be named a first component without departing from the scope of the present disclosure.

Additionally, when a component is referred to as being “formed” or “laminated” on another component, it may be formed or laminated by being directly attached to the entire surface or one side of the surface of the other component. However, it should be understood that other components may exist in the middle.

Hereinafter, the three-dimensionally stacked multi-mode sensor 10 of the present disclosure and the display device including the same will be described in detail. However, this is presented as embodiments, and the present disclosure is not limited thereby, and the present disclosure is only defined by the scope of the claims to be described later.

Figure 1A:
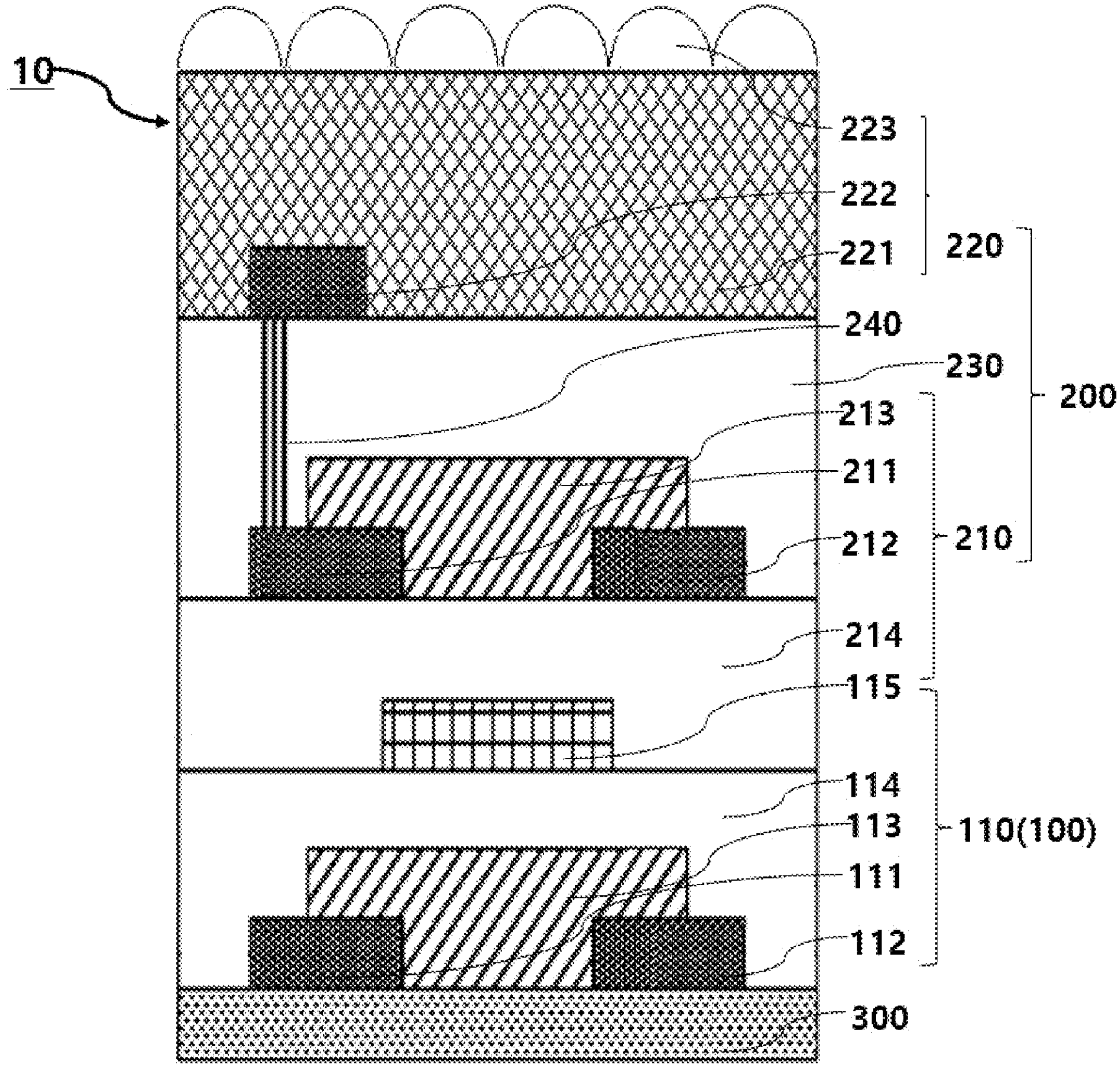
FIG. 1A is a diagram showing the structure of a sensor according to Example 1-1 of the present disclosure.
Figure 1B:
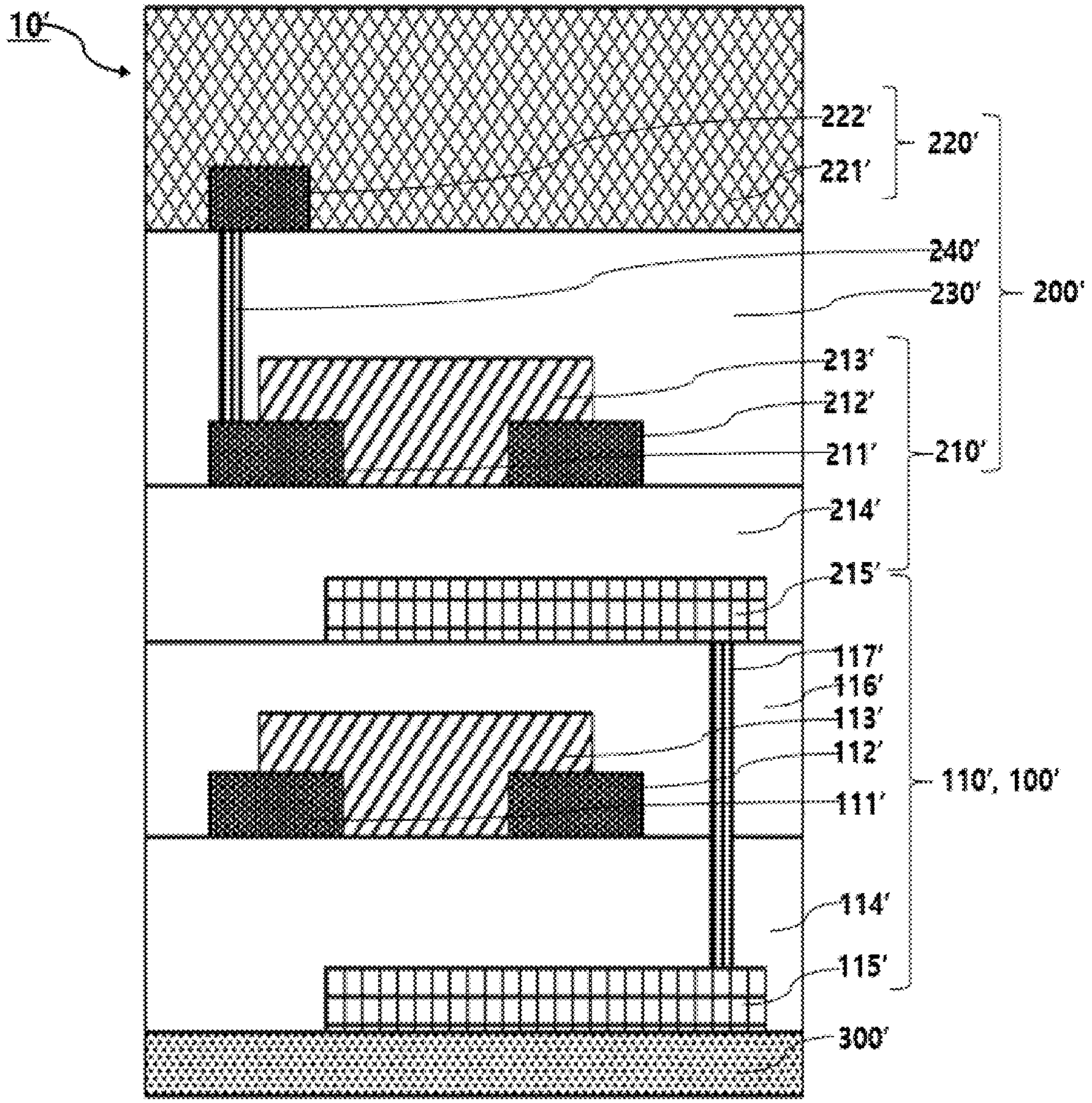
FIG. 1B is a diagram showing the structure of a sensor according to Example 1-2 of the present disclosure.
Figure 1C:
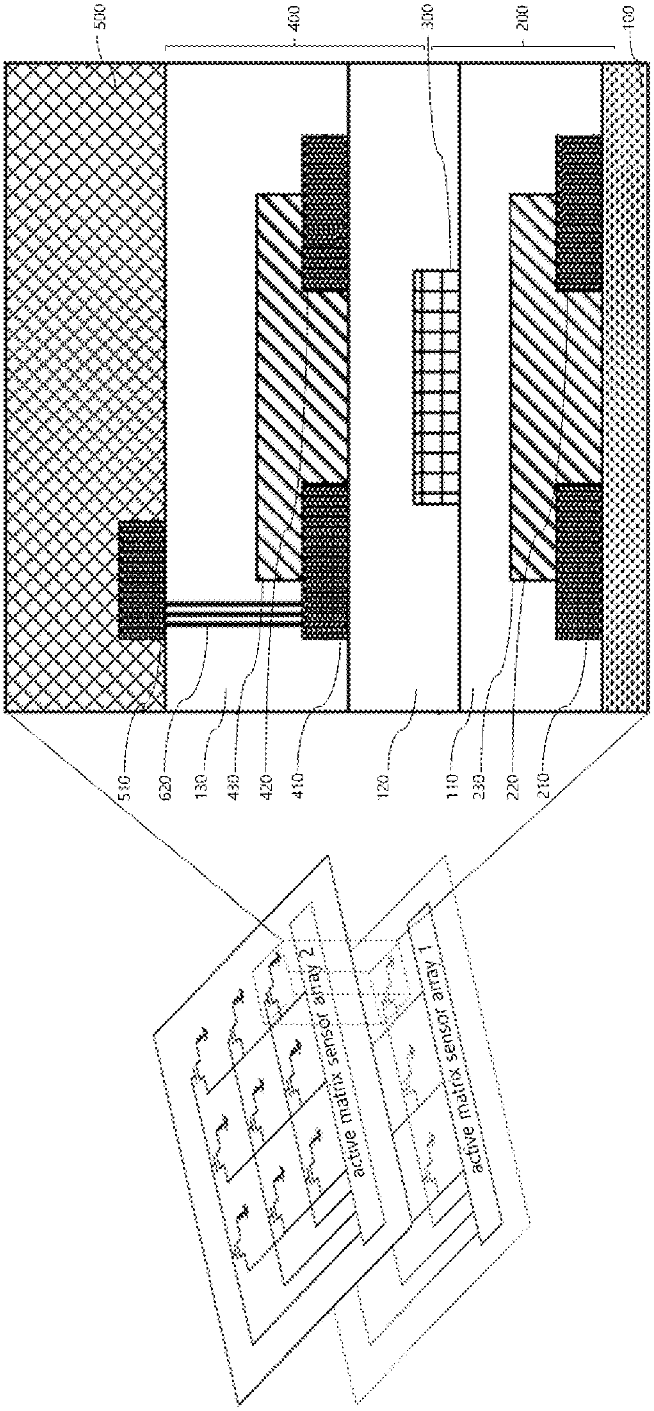
FIG. 1C is an enlarged view of the sensor arrays showing the structure of one sensor according to Example 2-1 of the present disclosure.
Figure 1D:
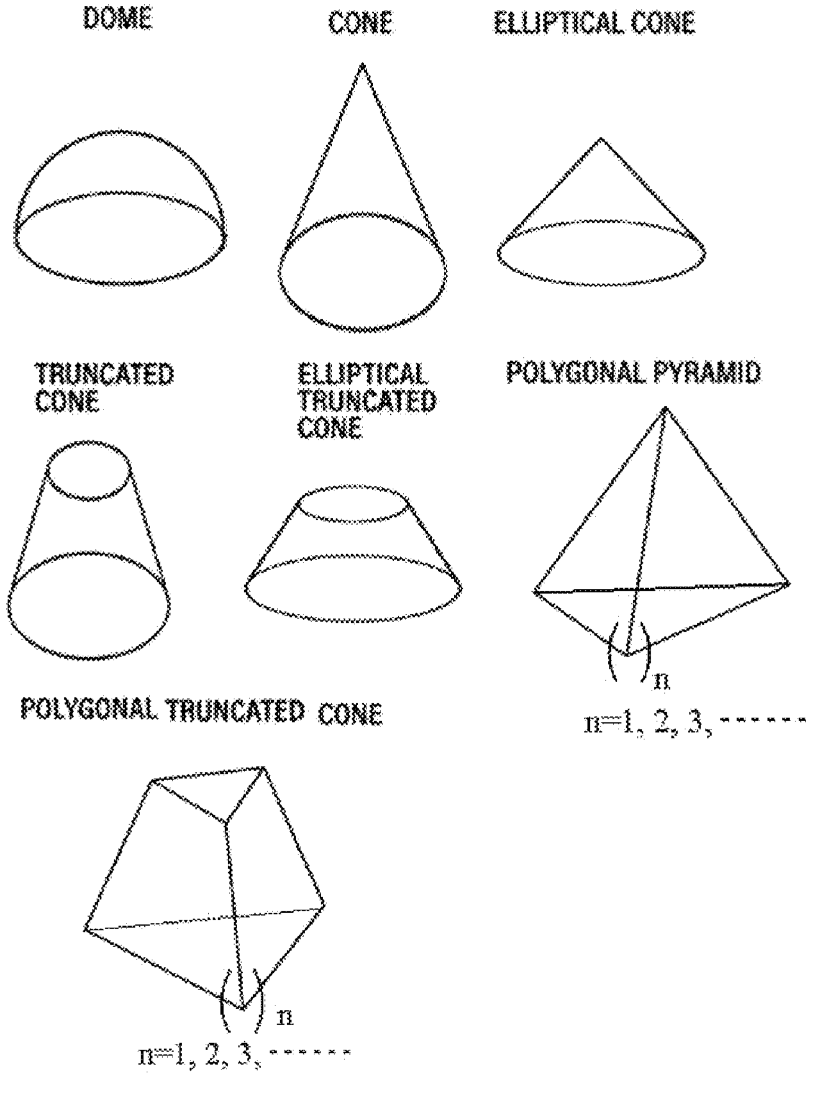
FIG. 1D shows shapes of the protrusions provided on the upper portion of the piezoresistive sheet.
Figure 2A:
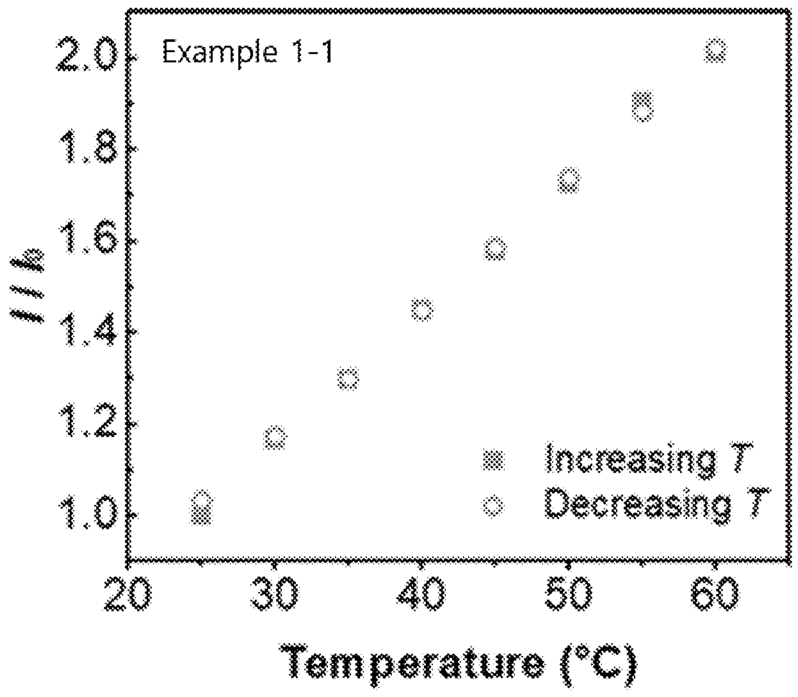
FIG. 2A is a diagram showing the temperature detection performance of the sensor according to Example 1-1 of the present disclosure.
Figure 2B:
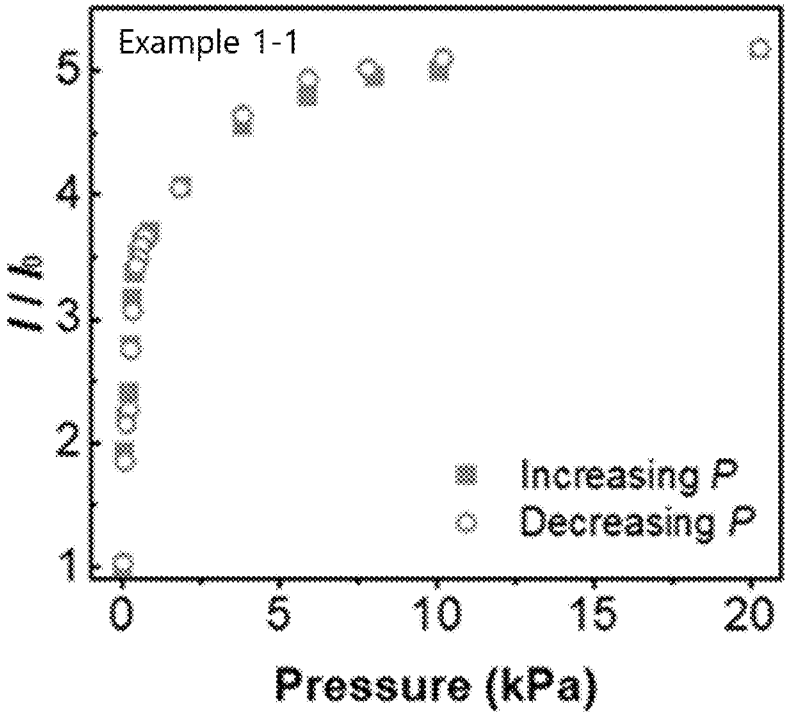
FIG. 2B is a diagram showing the pressure detection performance of the sensor according to Example 1-1 of the present disclosure.

FIG. 1A is a diagram showing the structure of a sensor according to Example 1-1 of the present disclosure, FIG. 1C is an enlarged view of the sensor arrays showing the structure of one sensor according to Example 2-1 of the present disclosure, FIG. 1D shows shapes of the protrusions provided on the upper portion of the piezoresistive sheet FIG. 2A is a diagram showing the temperature detection performance of the sensor according to Example 1-1 of the present disclosure, and FIG. 2B is a diagram showing the pressure detection performance of the sensor according to Example 1-1 of the present disclosure.

Referring to FIGS. 1A, 1C, 2A, and 2B, the present disclosure provides a three-dimensionally stacked multi-mode sensor 10 for simultaneously detecting pressure and temperature. The multi-mode sensor 10 includes a temperature sensor part 100 including a first thin film transistor 110; and a pressure sensor part 200 including a second thin film transistor 210 and a piezoresistive layer 220 stacked in a perpendicular direction on the temperature sensor part 100, the piezoresistive layer 220 including a piezoresistive sheet 221.

In addition, a three-dimensionally stacked multi-mode sensor 10 can measure the pressure value by adjusting the current value measured by the pressure sensor part 200 corresponding to temperature measured by the temperature sensor part 100.

The adjustment may be accomplished using a temperature adjustment algorithm. The pressure sensor part 200 exhibits constant temperature sensitivity as the temperature increases, and the current value in the pressure sensor unit can be easily and effectively adjusted corresponding to linear and constant temperature sensitivity data.

In addition, the first thin film transistor 110 may include a first source electrode 111 and a first drain electrode 112; a first semiconductor channel layer 113 formed between the first source electrode 111 and the first drain electrode 112; a first dielectric layer 114 formed on the first source electrode 111, the first drain electrode 112, and the first semiconductor channel layer 113; and a first gate electrode 115 formed on the first dielectric layer 114.

In addition, the second thin film transistor 210 may include a first gate electrode 115; a second dielectric layer 214 formed on the first gate electrode 115; a second source electrode 211 and a second drain electrode 212 formed on the second dielectric layer 214; and a second semiconductor channel layer 213 formed between the second source electrode 211 and the second drain electrode 212. The second thin film transistor 210 and the first thin film transistor 110 may share the first gate electrode 115.

In addition, the piezoresistive layer 220 may further include a pad 222 electrically connected to the piezoresistive sheet 221. The pressure sensor part 200 may further include a via 240 electrically connecting the pad 222 and the second source electrode 211 to each other.

In addition, the upper portion of the piezoresistive sheet 221 may be provided with a plurality of protrusions 223 protruding outward. Each of the protrusions may have a shape in which the cross-sectional area thereof gradually increases as a distance to the second semiconductor channel layer decreases.

In addition, when an external pressure source applies an increasing force in a direction perpendicular to the piezoresistive sheet 221, the protrusions 223 may be deformed, and the resistance value of the piezoresistive sheet 221 may decrease.

Additionally, referring to FIG. 1D, the protrusions 223 may have the shape of a dome, cone, elliptical cone, polygonal pyramid, truncated cone, elliptical truncated cone, or polygonal truncated cone shape.

In addition, the piezoresistive sheet 221 may include an elastic body and a conductive material.

Additionally, the conductive material may include one or more types selected from the group consisting of reduced graphene oxides (rGOs), carbon nanotubes (CNTs), graphene, carbon black, graphite, poly(3,4-ethylenedioxythiophene) (PEDOT), Al, Au, Cu, Ag, Ti, and Pt.

Additionally, the elastic body may include one or more types selected from the group consisting of polyvinylidene fluoride(PVDF), polydimethyl siloxane(PDMS), ecoflex, silicone rubber, fluoro silicone rubber, vinyl methyl silicone rubber, styrene-butadiene rubber, styrene-ethylene-butylene-styrene rubber, acryl rubber, butadiene rubber, chloro isobutylene isoprene rubber, polychloroprene rubber, epichlorohydrin rubber, ethylene propylene rubber, ethylene propylene diene rubber, polyether urethane rubber, polyisoprene rubber, isobutylene isoprene butyl rubber, acrylonitrile butadiene rubber, and polyurethane rubber.

In addition, the first gate electrode 115, the first source electrode 111, the second source electrode 211, the first drain electrode 112, or the second drain electrode 212 may include one or more types selected from the group consisting of Au, Al, Ag, Be, Bi, Co, Cu, Cr, Hf, In, Mn, Mo, Mg, Ni, Nb, Pb, Pd, Pt, Rh, Re, Ru, Sb, Ta, Te, Ti, V, W, Zr, Zn, PEDOT:PSS, graphene, carbon nanotubes (CNTs), and silver nanowires.

In addition, the pressure sensor unit may further include a protective layer 230 provided between the second semiconductor channel layer 213 and the piezoresistive sheet 221.

Additionally, the protective layer 230 may include one or more types selected from the group consisting of parylene, polydimethylsiloxane (PDMS), Cytop, polystyrene (PS), polymethylmethacrylate (PMMA), polyvinyl pyrrolidone (PVP), polyimide (PI), $SiO_2$, $Al_2O_3$, $HfO_2$, $ZrO_2$, $Y_2O_3$, and $Ta_2O_5$.

In addition, the three-dimensionally stacked multi-mode sensor 10 further includes a substrate 300, and the substrate 300 is positioned on the first source electrode 111, the first drain electrode 112, and the first semiconductor channel layer 113 and disposed on a side opposite to the first gate electrode 115.

In addition, the substrate may include one or more types selected from the group consisting of polymer, silicon, glass, and metal.

In addition, the polymer may include one or more types selected from the group consisting of parylene, poly(ethylene 2,6-naphthalate) (PEN), poly(ethylene terephthalate) (PET), polyimide(PI), polyethersulphone, polyacrylate, polyetherimide, polyphenylene sulfide, polyallylate, polycarbonate, cellulose triacetate, and cellulose acetate propionate.

In addition, the semiconductor channel layer may include one or more types selected from the group consisting of a n-type organic semiconductor, a p-type organic semiconductor, and an oxide semiconductor.

Additionally, the n-type organic semiconductor may include one or more types selected from the group consisting of DPP-DTT(poly[2,5-(2-octyldodecyl)-3,6-diketopyrrolopyrrole-alt-5,5-(2,5-di(thien-2-yl)thieno[3,2-b]thiophene)]), N2200(poly{[N,N'-bis(2-octyldodecyl)-naphthalene-1,4,5,8-bis(dicarboximide)-2,6-diyl]-alt-5,5'-(2,2'-bithiophene)}, anthracene, tetracene, hexacene, quinoline, naphthylridine, quinazoline, anthradithiophene, fluorene, perylenedicarboximide, naphthalene diimide, oligo-thiophene, 6,13-bis(triisopropylsilylethynyl)pentacene, 5,11-bis(triethylsilylethynyl)anthradithiophene, 2,8-difluoro-5,11-bis (triethylsilylethynyl)anthradithiophene, PCBM, Cu-phthalocyanine, and Zn-Phthalocyanine. The p-type organic semiconductor may include one or more types selected from the group consisting of diF-TES-ADT(2,8-difluoro-5,11-bis(triethylsilylethynyl)anthradithiophene), pentacene, poly(3-hexylthiophene), poly(3-pentylthiophene), poly3-(butylthiophene), benzo[1,2-b:4,5-b']dithiophene, PBDT2FBT-2EHO(poly(4,8-bis(2-ethylhexyloxy) benzo[1,2-b:4,5-b']dithiophene-alt-4,7-bis(4-(2-ethylhexyl)-2-thienyl)-5,6-difluoro-2,1,3-benzothiadiazole), and PDPP3T(poly(diketopyrrolopyrrole-terthiophene)).

FIG. 1B is a diagram showing the structure of a sensor according to Example 1-2 of the present disclosure, FIG. 2A is a diagram showing the temperature detection performance of the sensor according to Example 1-1 of the present disclosure, and FIG. 2B is a diagram showing the pressure detection performance of the sensor according to Example 1-1 of the present disclosure.

Referring to FIGS. 1B, 2A, and 2B, the present disclosure provides a three-dimensionally stacked multi-mode sensor 10' for simultaneously detecting pressure and temperature. The sensor includes a temperature sensor part 100' including a first' thin film transistor 110'; and a pressure sensor part 200' including a second' thin film transistor 210' and a piezoresistive layer 220' stacked in a perpendicular direction on the temperature sensor part 100', the piezoresistive layer 220' including a piezoresistive sheet 221'. The first' thin film transistor 110' includes a first' gate electrode 115'; a first' dielectric layer 114' formed on the first' gate electrode 115'; a first' source electrode 111' and a first' drain electrode 112' formed on the first' dielectric layer 114'; a first' semiconductor channel layer 113' formed between the first' source electrode 111' and the first' drain electrode 112'; a second' dielectric layer 116' formed on the first' semiconductor channel layer 113'; and a second' gate electrode 215' formed on the second' dielectric layer 116'. The second' thin film transistor 210' includes a second' gate electrode 215'; a third' dielectric layer 214' formed on the second' gate electrode 215'; a second' source electrode 211' and a second' drain electrode 212' formed on the third' dielectric layer 214'; and a second' semiconductor channel layer 213' formed between the second' source electrode 211' and the second' drain electrode 212'.

Additionally, the pressure sensor part 200' may further include a protective layer 230' provided between the second' semiconductor channel layer 213' and the piezoresistive sheet 221'.

Additionally, the piezoresistive layer 220' may further include a pad 222' electrically connected to the piezoresistive sheet 221'. The pressure sensor part 200' may further include a via 240' electrically connecting the pad 222' and the second' source electrode 211' to each other.

In addition, the first' thin film transistor 110' may further include a via 117' electrically connecting the first' gate electrode 115' and the second' gate electrode 215' to each other.

In another aspect, the present disclosure provides three-dimensionally stacked multi-mode sensor arrays 20 for simultaneously detecting pressure and temperature. The multi-mode sensor arrays include multiple three-dimensionally stacked multi-mode sensors arranged in multiple rows and multiple columns. The multi-mode sensor arrays include a temperature sensor part 100 including a first thin film transistor 110; and a pressure sensor part 200 including a second thin film transistor 210 and a piezoresistive layer 220 stacked in a perpendicular direction on the temperature sensor part 100, the piezoresistive layer 220 including a piezoresistive sheet 221. The first thin film transistor 110 and the second thin film transistor 210 located in each row share a gate electrode. The first thin film transistor 110 and the second thin film transistor 210 located in each column share drain electrodes 112, 212.

In yet another aspect, the present disclosure provides a method of manufacturing a three-dimensionally stacked multi-mode sensor 10 for simultaneously detecting pressure and temperature. The method includes:

(a) forming a temperature sensor part 100 including a first thin film transistor 110; and (b) forming a pressure sensor part 200 including a second thin film transistor 210 and a piezoresistive sheet 221 stacked in a perpendicular direction on the temperature sensor part 100.

Additionally, step (a) may include:

(a-1) forming a first source electrode 111 and a first drain electrode 112;

(a-2) forming a first semiconductor channel layer 113 between the first source electrode 111 and the first drain electrode 112;

(a-3) forming a first dielectric layer 114 on the first source electrode 111, the first drain electrode 112, and the first semiconductor channel layer 113; and (a-4) forming a first gate electrode 115 on the first dielectric layer 114.

In addition, step (b) may include:

(b-1) forming a second dielectric layer 214 on the first gate electrode 115;

(b-2) forming a second source electrode 211 and a second drain electrode 212 on the second dielectric layer 214; and (b-3) forming a second semiconductor channel layer 213 between the second source electrode 211 and the second drain electrode 212.

The second thin film transistor 210 and the first thin film transistor 110 may share the first gate electrode 115.

In addition, step (a-1) may be carried out by inkjet printing.

In addition, step (a-3) may be carried out by chemical vapor deposition (CVD).

EXAMPLES

Hereinafter, the present disclosure will be described with reference to preferred embodiments. However, this is for illustrative purposes only and does not limit the scope of the present disclosure.

Example 1: Manufacturing of Three-Dimensionally Stacked Multi-Mode Sensor

Example 1-1: Stacked Multimode Sensor where Two Single-Gate Thin-Film Transistors Share a Gate Electrode FIG. 1A is a diagram showing the structure of a sensor according to Example 1-1 of the present disclosure. Referring to FIG. 1A, a first source electrode and a first drain electrode were formed by inkjet printing using silver nano ink on a flexible parylene substrate. By printing by a nozzle printing method using a solution of DPP-DTT(poly[2,5-(2-octyldodecyl)-3,6-diketopyrrolopyrrole-alt5,5-(2,5-di (thien-2-yl)thieno[3,2-b]thiophene)]), which was an organic semiconductor material, a first semiconductor channel layer covering the first source electrode, the first drain electrode, and the space between the first source electrode and the first drain electrode was formed. Parylene was chemically vapor deposited thereon to form a first dielectric layer. Silver nano ink was used for printing to form a first gate electrode shared by a first thin film transistor in the lower portion and a second thin film transistor in the upper portion. Thus, a temperature sensor part was formed. A second dielectric layer of parylene, a second source electrode, a second drain electrode, and a second semiconductor channel layer were formed on the first gate electrode, which was a shared gate electrode, in the same manner as described above. Parylene was deposited again to form a protective layer, a via hole was formed through a laser process, and silver nano ink was used for printing to form a via to connect the second source electrode of the second thin film transistor in the upper portion to a piezoresistive sheet. A pressure sensor part was formed by electrically and physically connecting the previously manufactured connector and the pad of the piezoresistive sheet using z-axis conductive tape (3M 9703). Ultimately, a three-dimensionally stacked multi-mode sensor for simultaneously detecting pressure and temperature was manufactured.

Example 1-2: a Stacked Multi-Mode Sensor where One Dual-Gate Thin-Film Transistor and One Single-Gate Thin-Film Transistor Share a Gate Electrode FIG. 1B is a diagram showing the structure of a sensor according to Example 1-2 of the present disclosure. Referring to FIG. 1B, a first gate electrode was formed by inkjet printing using silver nano ink on a flexible parylene substrate. Parylene was chemically vapor deposited thereon to form a first dielectric layer covering the first gate electrode. Silver nano ink was used for printing to form a first source electrode and a first drain electrode. By printing by a nozzle printing method using a solution of DPP-DTT(poly[2,5-(2-octyldodecyl)-3,6-diketopyrrolopyrrole-alt-5,5-(2,5-di (thien-2-yl)thieno[3,2-b]thiophene)]), which was an organic semiconductor material, a temperature sensor part was formed by forming the first source electrode, the first drain electrode, and a first semiconductor channel layer covering the space between the first source electrode and the first drain electrode. Parylene was chemically vapor deposited thereon to form a second dielectric layer. To form a second gate electrode connected to the first gate electrode, a via hole was formed through a laser process, the via hole penetrating the first and second dielectric layers and being connected to the first gate electrode, and a second gate electrode was formed through printing using silver nano ink, the second gate electrode being a shared gate electrode shared by the via, the first thin film transistor in the lower portion, and the second thin film transistor in the upper portion. A third dielectric layer of parylene, a second source electrode, a second drain electrode, and a second semiconductor channel layer were formed in the same manner as described above. Parylene was deposited again to form a protective layer, a via hole was formed through a laser process, and silver nano ink was used for printing to form a via to connect the second source electrode of the second thin film transistor in the upper portion to a piezoresistive sheet. Finally, a pressure sensor part was formed by electrically and physically connecting the previously manufactured connector and the pad of the piezoresistive sheet using z-axis conductive tape (3M 9703). Ultimately, a three-dimensionally stacked multi-mode sensor was manufactured.

Example 2: Fabrication of Three-Dimensionally Stacked Multi-Mode Sensor Arrays

Example 2-1: Stacked Multimode Sensor Arrays where Two Single-Gate Thin-Film Transistors Share a Gate Electrode FIG. 1C is an enlarged view of the sensor arrays showing the structure of one sensor according to Example 2-1 of the present disclosure, and FIG. 5 is a diagram showing three-dimensionally stacked multi-mode sensor arrays according to Example 2-1 or Example 2-2 sharing drain electrodes and source electrodes.

Figure 5:
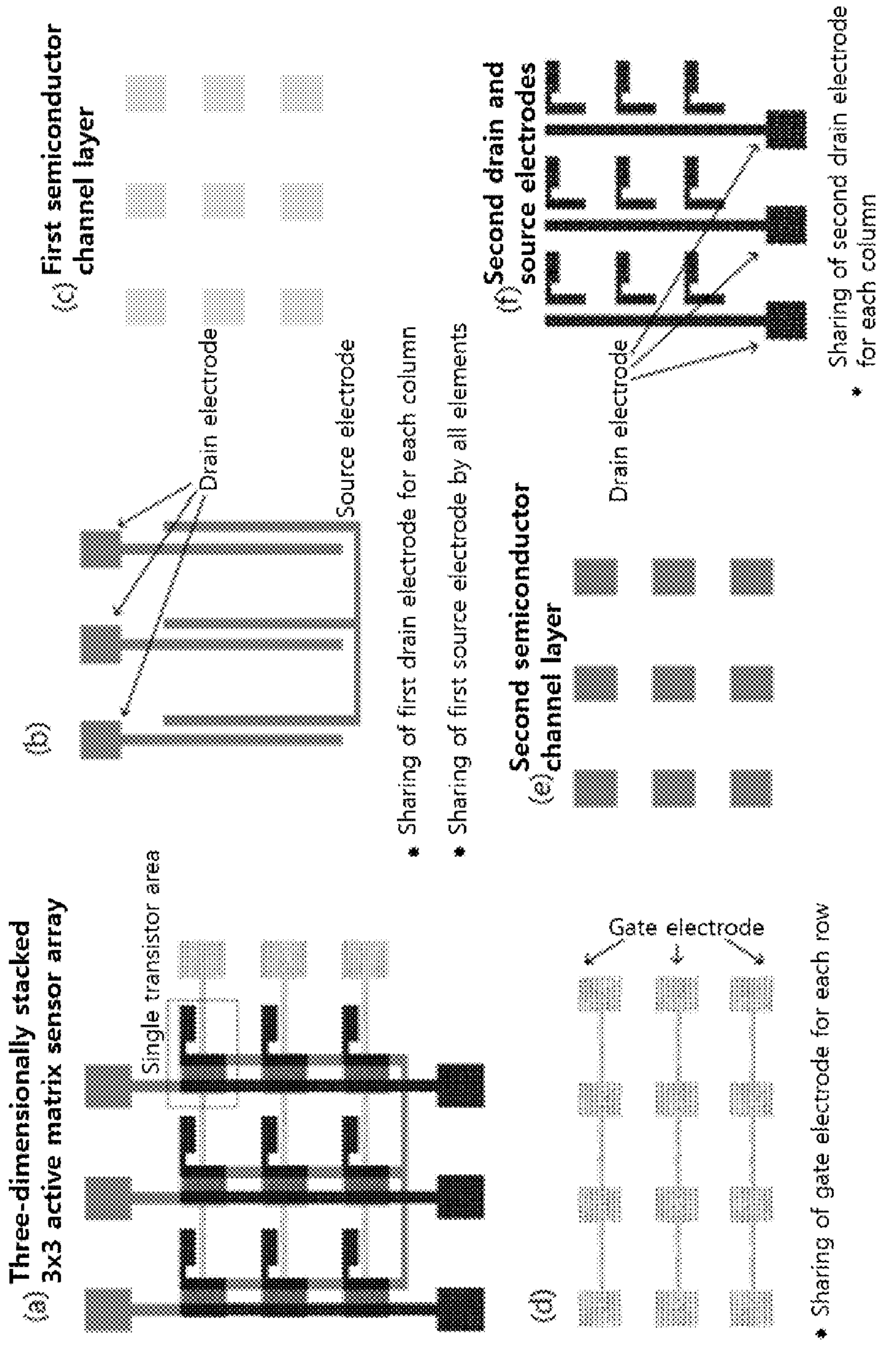
FIG. 5 is a diagram showing three-dimensionally stacked multi-mode sensor arrays according to Example 2-1 or Example 2-2 sharing drain electrodes and source electrodes.

Referring to FIGS. 1C and 5, active matrix three-dimensionally stacked multimode sensor arrays capable of simultaneously measuring temperature and pressure were fabricated as shown below by stacking a 3×3 active matrix temperature sensor part and a 3×3 active matrix pressure sensor part thereon.

The 3×3 active matrix temperature sensor part was formed on a flexible Parylene substrate as shown below. Silver nano ink was used for printing on the substrate to form a first source electrode and a first drain electrode. By printing by a nozzle printing method using a solution of DPP-DTT(poly[2,5-(2-octyldodecyl)-3,6-diketopyrrolopyrrole-alt-5,5-(2,5-di(thien-2-yl)thieno[3,2-b]thiophene)]), which was an organic semiconductor material, a first semiconductor channel layer covering the first source electrode, the first drain electrode, and the space between the first source electrode and the first drain electrode was formed. Herein, the transistors located in each column were manufactured to share the first drain electrode, and all transistors shared the first source electrode. Parylene was chemically vapor deposited thereon to form a first dielectric layer. Silver nano ink was used for printing to form a first gate electrode, which is a shared gate electrode shared by the first thin film transistor in the lower portion and the second thin film transistor in the upper portion. Thus, the active matrix temperature sensor part including the first thin film transistor was formed. Herein, the transistors located in each row were manufactured to share the first gate electrode.

The 3×3 active matrix pressure sensor part was formed on the active matrix temperature sensor part as shown below. A second thin film transistor was formed by forming a second dielectric layer of parylene, a second source electrode, a second drain electrode, and a second semiconductor channel layer on the shared gate electrode in the same manner as described above. Herein, the transistors located in each column were manufactured to share the second drain electrode. Parylene was deposited again to form a protective layer, a via hole was formed through a laser process, and silver nano ink was used for printing to form a via to connect the second source electrode of the second thin film transistor in the upper portion to a piezoresistive sheet. The active matrix pressure sensor part including a second thin film transistor was formed by electrically and physically connecting the previously manufactured connector and the pad of the piezoresistive sheet using z-axis conductive tape (3M 9703). Ultimately, three-dimensionally stacked multi-mode sensor arrays for simultaneously detecting pressure and temperature were manufactured.

Example 2-2: Stacked Multi-Mode Sensor Arrays where One Dual-Gate Thin-Film Transistor and One Single-Gate Thin-Film Transistor Share a Gate Electrode FIG. 1B is a diagram showing the structure of a sensor according to Example 1-2 of the present disclosure, FIG. 1C is a view showing the structure of one sensor by enlarging the sensor arrays of the sensor according to Example 2-1 of the present disclosure, and FIG. 5 is a diagram showing three-dimensionally stacked multi-mode sensor arrays according to Example 2-1 or Example 2-2 sharing drain electrodes and source electrodes.

Referring to FIGS. 1B, 1C, and 5, active matrix three-dimensionally stacked multimode sensor arrays capable of simultaneously measuring temperature and pressure were fabricated as shown below by stacking a 3×3 active matrix temperature sensor part and a 3×3 active matrix pressure sensor part thereon.

The 3×3 active matrix temperature sensor part was formed on a flexible Parylene substrate as shown below. Silver nano ink was used for printing to form a first gate electrode. Parylene was chemically vapor deposited thereon to form a first dielectric layer covering the first gate electrode. Silver nano ink was used for printing to form a first source electrode and a first drain electrode. By printing by a nozzle printing method using a solution of DPP-DTT(poly [2,5-(2-octyldodecyl)-3,6-diketopyrrolopyrrole-alt-5,5-(2,5-di(thien-2-yl)thieno[3,2-b]thiophene)]), which was an organic semiconductor material, a first semiconductor channel layer covering the first source electrode, the first drain electrode, and the space between the first source electrode and the first drain electrode was formed. Herein, the transistors located in each column were manufactured to share the first drain electrode, and all transistors shared the first source electrode. Parylene was chemically vapor deposited thereon to form a second dielectric layer. To form a second gate electrode connected to the first gate electrode, a via hole was formed through a laser process, the via hole penetrating the first and second dielectric layers and being connected to the first gate electrode, and a second gate electrode was formed through printing using silver nano ink, the second gate electrode being a shared gate electrode shared by the via. Thus, the active matrix temperature sensor part including a first thin film transistor was formed. Herein, the transistors located in each row were manufactured to share the second drain electrode.

The 3×3 active matrix pressure sensor part was formed on the active matrix temperature sensor part as shown below. A second thin film transistor was formed by forming a third dielectric layer of parylene, a second source electrode, a second drain electrode, and a second semiconductor channel layer on the second gate electrode, which was the shared gate electrode, in the same manner as described above. Herein, the transistors located in each column were manufactured to share the second drain electrode. Parylene was deposited again to form a protective layer, a via hole was formed through a laser process, and silver nano ink was used for printing to form a via to connect the second source electrode of the second thin film transistor in the upper portion to a piezoresistive sheet. The active matrix pressure sensor part including a second thin film transistor was formed by electrically and physically connecting the previously manufactured connector and the pad of the piezoresistive sheet using z-axis conductive tape (3M 9703). Ultimately, three-dimensionally stacked multi-mode sensor arrays for simultaneously detecting pressure and temperature were manufactured.

EXPERIMENT EXAMPLES

Experiment Example 1: Confirmation of Detecting Performance on Temperature and Pressure FIG. 2A is a diagram showing the temperature detection performance of the sensor according to Example 1-1 of the present disclosure, FIG. 2B is a diagram showing the pressure detection performance of the sensor according to Example 1-1 of the present disclosure, FIG. 3A is a diagram showing the results of the current change in the pressure sensor part as the pressure and temperature of the sensor increase according to Example 1-1 of the present disclosure, as with the current change in the pressure sensor part as the y-axis and pressure as the x-axis, FIG. 3B is a diagram showing the results of the current change in the temperature sensor part as the pressure and temperature of the sensor increase according to Example 1-1 of the present disclosure, as with the current change in the temperature sensor part as the y-axis and temperature as the x-axis, and FIG. 3C is a diagram showing the result of adjusting the current value measured in the pressure sensor part corresponding to temperature measured in the temperature sensor part of the sensor according to Example 1-1 of the present disclosure.

Referring to FIGS. 2A, 2B, 3A, 3B, and 3C, a three-dimensionally stacked multi-mode sensor detected temperatures of 25° C., 30° C., 40° C., 50° C., and 60° C. and pressures between 0 kPa, 0.1 kPa, 0.5 kPa, and 20 kPa. FIG. 2A shows the change in the current value measured at the temperature sensor part of the sensor while changing the temperature from 25° C. to 60° C. The sensor current was measured by applying a voltage of −10V to a gate electrode and drain electrode. Based on the current value at a temperature of 25° C., the current value for each temperature was expressed as a relative value. FIG. 2B shows the change in current value in the sensor measured at the pressure sensor part of the sensor while changing the pressure from 0 kPa to 20 kPa. Again, a voltage of −10V was used as the operating voltage, and based on the current value at 0 kPa, the current value for each pressure was expressed as a relative current value. In FIGS. 2A, 2B, 3A, and 3B, the current value increased as the size of the stimulus increased, and almost no hysteresis was observed.

Experiment Example 2: Confirmation of Current Value Adjustment of Pressure Sensor Part Corresponding to Temperature Information FIG. 3A is a diagram showing the results of the current change in the pressure sensor part as the pressure and temperature of the sensor increase according to Example 1-1 of the present disclosure, as with the current change in the pressure sensor part as the y-axis and pressure as the x-axis, FIG. 3B is a diagram showing the results of the current change in the temperature sensor part as the pressure and temperature of the sensor increase according to Example 1-1 of the present disclosure, as with the current change in the temperature sensor part as the y-axis and temperature as the x-axis, and FIG. 3C is a diagram showing the result of adjusting the current value measured in the pressure sensor part corresponding to temperature measured in the temperature sensor part of the sensor according to Example 1-1 of the present disclosure.

Figure 3A:
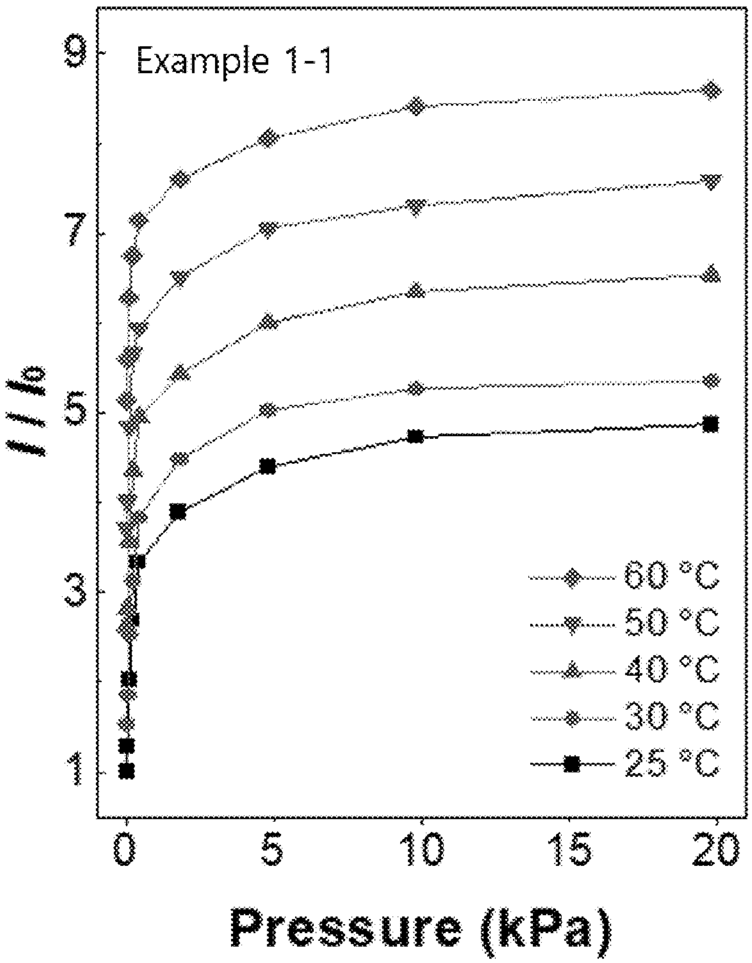
FIG. 3A is a diagram showing the results of the current change in the pressure sensor part as the pressure and temperature of the sensor increase according to Example 1-1 of the present disclosure, as with the current change in the pressure sensor part as the y-axis and pressure as the x-axis.
Figure 3B:
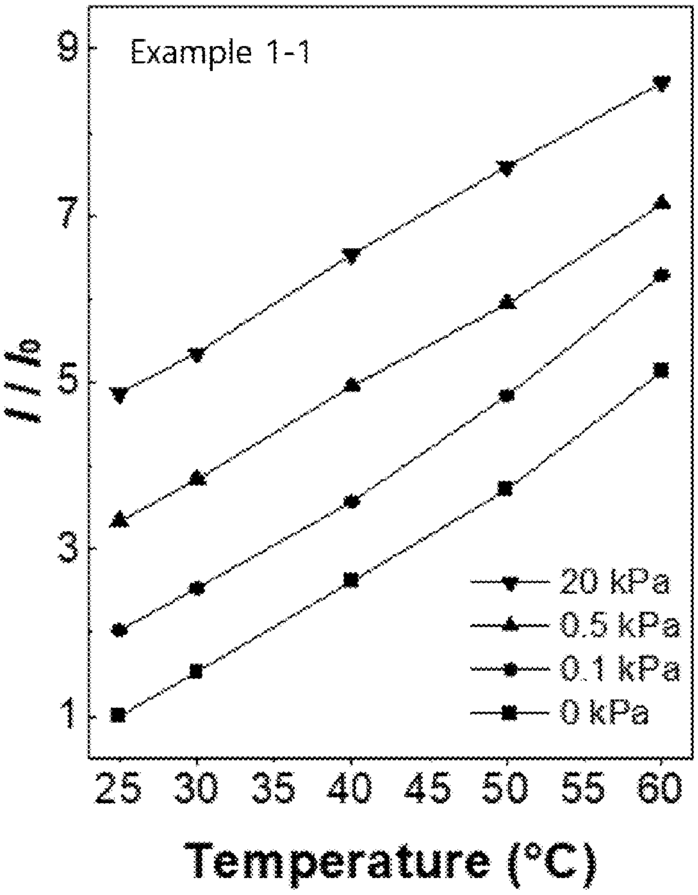
FIG. 3B is a diagram showing the results of the current change in the temperature sensor part as the pressure and temperature of the sensor increase according to Example 1-1 of the present disclosure, as with the current change in the temperature sensor part as the y-axis and temperature as the x-axis.
Figure 3C:
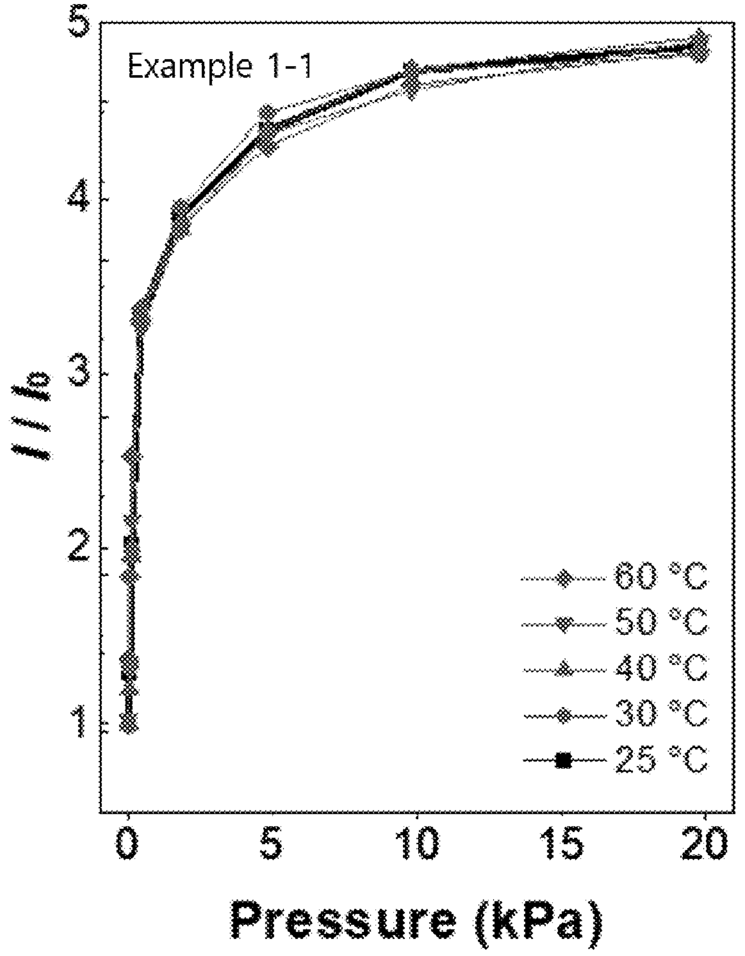
FIG. 3C is a diagram showing the result of adjusting the current value measured in the pressure sensor part corresponding to temperature measured in the temperature sensor part of the sensor according to Example 1-1 of the present disclosure.

Referring to FIGS. 3A, 3B, and 3C, the current value measured in the pressure sensor part was adjusted corresponding to linear and constant temperature sensitivity data obtained on the basis of temperature information from the temperature sensor part. Thus, pressure could be measured accurately without being affected by temperature.

Experiment Example 3: Confirmation of Simultaneously Detecting Performance on Temperature and Pressure FIG. 4A is a diagram showing two objects of the same weight but different temperatures placed on the sensor arrays according to Example 2-1 of the present disclosure to demonstrate the simultaneous pressure and temperature detection performance of the sensor arrays, FIG. 4B is a diagram showing the results of the pressure sensor part of the sensor arrays according to Example 2-1 of the present disclosure, and FIG. 4C is a diagram showing the results of the temperature sensor part of the sensor arrays according to Example 2-1 of the present disclosure.

Figure 4A:
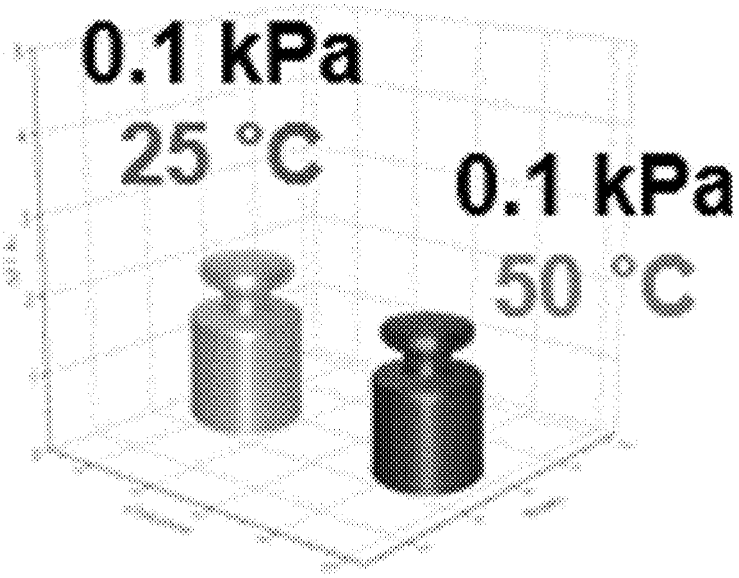
FIG. 4A is a diagram showing two objects of the same weight but different temperatures placed on the sensor arrays according to Example 2-1 of the present disclosure to demonstrate the simultaneous pressure and temperature detection performance of the sensor arrays.
Figure 4B:
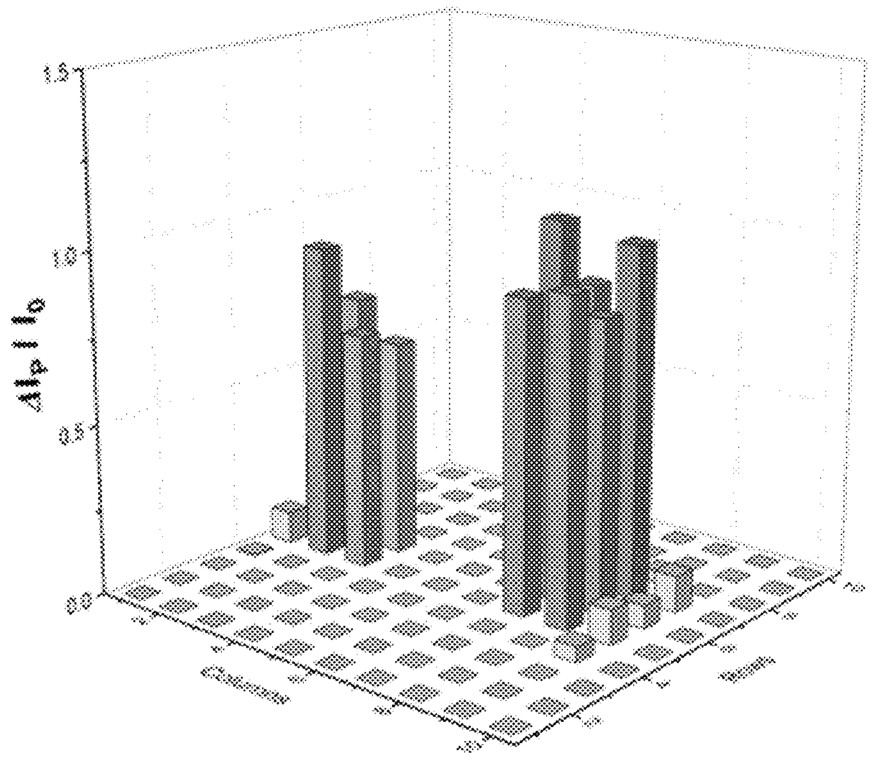
FIG. 4B is a diagram showing the results of the pressure sensor part of the sensor arrays according to Example 2-1 of the present disclosure.
Figure 4C:
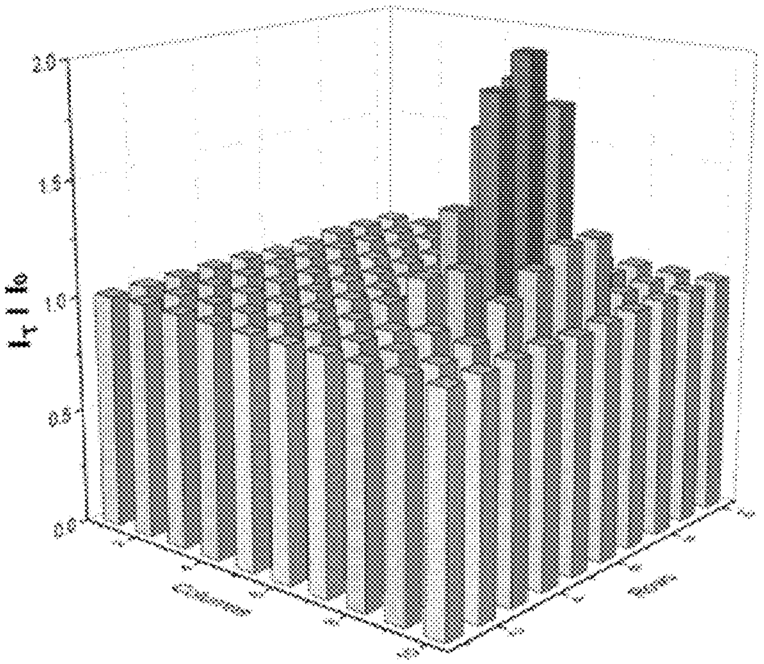
FIG. 4C is a diagram showing the results of the temperature sensor part of the sensor arrays according to Example 2-1 of the present disclosure.

Referring to FIGS. 4A, 4B, and 4C, current changes depending on pressure and temperature were measured respectively after having two objects of the same weight but different temperatures placed on 10×10 three-dimensionally stacked multimode sensor arrays. The current change was measured based on the current value at a pressure of 0 kPa and a temperature of 25° C. In the pressure sensor part, similar current changes were shown at the positions of the two objects. In the temperature sensor part, a clear increase in current was shown only at the location where the object placed had a temperature of 50° C. Through this, it was confirmed that the current value of the pressure sensor part was adjusted corresponding to the temperature data obtained on the basis of temperature information from the temperature sensor part, and each sensor detected changes in only the stimulus of the target without being affected by other stimuli.

The scope of the present disclosure is indicated by the claims described later rather than the detailed description above. All changes or modified forms derived from the meaning and scope of the patent claims and their equivalent concepts should be construed as being included in the scope of the present disclosure.

What is claimed is:

1. A three-dimensionally stacked multi-mode sensor for simultaneously detecting pressure and temperature, the multi-mode sensor comprising:
- a temperature sensor part comprising a first thin film transistor; and
- a pressure sensor part comprising a second thin film transistor and a piezoresistive layer stacked in a perpendicular direction on the temperature sensor part, the piezoresistive layer comprising a piezoresistive sheet.

2. The multi-mode sensor of claim 1, wherein the multi-mode sensor measures the pressure value by adjusting a current value measured by the pressure sensor part corresponding to a temperature measured by the temperature sensor part.

3. The multi-mode sensor of claim 1, wherein the first thin film transistor comprises:
- a first source electrode and a first drain electrode;
- a first semiconductor channel layer formed between the first source electrode and the first drain electrode;
- a first dielectric layer formed on the first source electrode, the first drain electrode, and the first semiconductor channel layer; and
- a first gate electrode formed on the first dielectric layer.

4. The multi-mode sensor of claim 3, wherein the second thin film transistor comprises:
- the first gate electrode;
- a second dielectric layer formed on the first gate electrode;
- a second source electrode and a second drain electrode formed on the second dielectric layer; and
- a second semiconductor channel layer formed between the second source electrode and the second drain electrode,
- wherein the second thin film transistor and the first thin film transistor share the first gate electrode.

5. The multi-mode sensor of claim 4, wherein the piezoresistive layer further comprises a pad electrically connected to the piezoresistive sheet, and
- the pressure sensor part further comprises a via electrically connecting the pad and the second source electrode to each other.

6. The multi-mode sensor of claim 4, wherein the first gate electrode, the first source electrode, the second source electrode, the first drain electrode, or the second drain electrode comprise one or more types selected from the group consisting of Au, Al, Ag, Be, Bi, Co, Cu, Cr, Hf, In, Mn, Mo, Mg, Ni, Nb, Pb, Pd, Pt, Rh, Re, Ru, Sb, Ta, Te, Ti, V, W, Zr, Zn, PEDOT:PSS, graphene, carbon nanotubes (CNTs), and silver nanowires.

7. The multi-mode sensor of claim 1, wherein an upper portion of the piezoresistive sheet is provided with a plurality of protrusions protruding outward, and
- each of the protrusions has a shape in which the cross-sectional area thereof gradually increases as a distance to the second semiconductor channel layer decreases.

8. The multi-mode sensor of claim 7, wherein when an external pressure source applies an increasing force in a direction perpendicular to the piezoresistive sheet, the protrusions are deformed, and a resistance value of the piezoresistive sheet decreases.

9. The multi-mode sensor of claim 7, wherein the protrusions have a dome, cone, elliptical cone, polygonal pyramid, truncated cone, elliptical truncated cone, or polygonal truncated cone shape.

10. The multi-mode sensor of claim 1, wherein the piezoresistive sheet comprises an elastic body and a conductive material.

11. The multi-mode sensor of claim 10, wherein the conductive material comprises one or more types selected from the group consisting of reduced graphene oxides (rGOs), carbon nanotubes (CNTs), graphene, carbon black, graphite, poly(3,4-ethylenedioxythiophene) (PEDOT), Al, Au, Cu, Ag, Ti, and Pt.

12. The multi-mode sensor of claim 10, wherein the elastic body comprises one or more types selected from the group consisting of polyvinylidene fluoride (PVDF), polydimethyl siloxane (PDMS), ecoflex, silicone rubber, fluoro silicone rubber, vinyl methyl silicone rubber, styrene-butadiene rubber, styrene-ethylene-butylene-styrene rubber, acryl rubber, butadiene rubber, chloro isobutylene isoprene rubber, polychloroprene rubber, epichlorohydrin rubber, ethylene propylene rubber, ethylene propylene diene rubber, polyether urethane rubber, polyisoprene rubber, isobutylene isoprene butyl rubber, acrylonitrile butadiene rubber, and polyurethane rubber.

13. The multi-mode sensor of claim 1, wherein the pressure sensor part further comprises a protective layer provided between the second semiconductor channel layer and the piezoresistive sheet.

14. The multi-mode sensor of claim 13, wherein the protective layer comprises one or more types selected from the group consisting of parylene, polydimethylsiloxane (PDMS), Cytop, polystyrene (PS), polymethylmethacrylate (PMMA), polyvinyl pyrrolidone (PVP), polyimide (PI), $SiO_2$, $Al_2O_3$, $HfO_2$, $ZrO_2$, $Y_2O_3$, and $Ta_2O_5$.

15. The multi-mode sensor of claim 1, wherein the three-dimensionally stacked multi-mode sensor further comprises a substrate, and
- the substrate is positioned on a first source electrode, a first drain electrode, and a first semiconductor channel layer and disposed on a side opposite to a first gate electrode.

16. The multi-mode sensor of claim 15, wherein the substrate comprises one or more types selected from the group consisting of polymer, silicon, glass, and a metal.

17. The multi-mode sensor of claim 16, wherein the polymer comprises one or more types selected from the group consisting of parylene, poly(ethylene 2,6-naphthalate) (PEN), poly(ethylene terephthalate) (PET), polyimide (PI), polyethersulphone, polyacrylate, polyetherimide, polyphenylene sulfide, polyallylate, polycarbonate, cellulose triacetate, and cellulose acetate propionate.

18. The multi-mode sensor of claim 1, wherein a semiconductor channel layer comprises one or more types selected from the group consisting of a n-type organic semiconductor, a p-type organic semiconductor, and an oxide semiconductor.

19. The multi-mode sensor of claim 18, wherein the n-type organic semiconductor comprises one or more types selected from the group consisting of DPP-DTT(poly[2,5-(2-octyldodecyl)-3,6-diketopyrrolopyrrole-alt-5,5-(2,5-di (thien-2-yl)thieno[3,2-b]thiophene)]), N2200(poly{[N,N'-bis(2-octyldodecyl)-naphthalene-1,4,5,8-bis (dicarboximide)-2,6-diyl]-alt-5,5'-(2,2'-bithiophene)}, anthracene, tetracene, hexacene, quinoline, naphthylridine, quinazoline, anthradithiophene, fluorene, perylenedicarboximide, naphthalene diimide, oligo-thiophene, 6,13-bis(triisopropylsilylethynyl)pentacene, 5,11-bis(triethylsilylethynyl)anthradithiophene, 2,8-difluoro-5,11-bis (triethylsilylethynyl)anthradithiophene, PCBM, Cu-phthalocyanine, and Zn-Phthalocyanine; and the p-type organic semiconductor comprises one or more types selected from the group consisting of diF-TES-ADT (2,8-Difluoro-5,11-bis(triethylsilylethynyl)anthradithiophene), pentacene, poly(3-hexylthiophene), poly(3-pentylthiophene), poly3-(butylthiophene), benzo[1,2-b:4,5-b']dithiophene, PBDT2FBT-2EHO (poly(4,8-bis(2-ethylhexyloxy)benzo[1,2-b:4,5-b']dithiophene-alt-4,7-bis(4-(2-ethylhexyl)-2-thienyl)-5,6-difluoro-2,1,3-benzothiadiazole), and PDPP3T(poly (diketopyrrolopyrrole-terthiophene)).

20. A three-dimensionally stacked multi-mode sensor comprising:

a temperature sensor part comprising a first' thin film transistor; and a pressure sensor part comprising a second' thin film transistor and a piezoresistive layer stacked in a perpendicular direction on the temperature sensor part the piezoresistive layer comprising a piezoresistive sheet, wherein the first' thin film transistor comprises:

a first' gate electrode;

a first' dielectric layer formed on the first' gate electrode;

a first' source electrode and a first' drain electrode formed on the first' dielectric layer;

a first' semiconductor channel layer formed between the first' source electrode and the first' drain electrode;

a second' dielectric layer formed on the first' semiconductor channel layer; and a second' gate electrode formed on the second' dielectric layer, and wherein the second' thin film transistor comprises:

the second' gate electrode;

a third' dielectric layer formed on the second' gate electrode;

a second' source electrode and a second' drain electrode formed on the third' dielectric layer; and a second' semiconductor channel layer formed between the second' source electrode and the second' drain electrode.

* * * * *